TRAP CIRCUIT FOR TELEVISION TUNERS

Filed April 19, 1967

INVENTOR.
STANLEY C. BYERS

By Mason, Kolehmainen
Rathburn & Wyss

United States Patent Office 3,550,010
Patented Dec. 22, 1970

3,550,010

TRAP CIRCUIT FOR TELEVISION TUNERS

Stanley C. Byers, Bloomington, Ind., assignor to Sarkes Tarzian, Inc., Bloomington, Ind., a corporation of Indiana Filed Apr. 19, 1967, Ser. No. 631,925
Int. Cl. H04b *1/10*
U.S. Cl. 325—379 8 Claims

ABSTRACT OF THE DISCLOSURE

A fixed capacitor is connected from one of the stator contacts of a turret type tuner to ground and cooperates with a portion of one of the coils on the individual sticks of the turret tuner to provide a series resonant trap circuit which attenuates FM signals during reception in channels 7 to 13, inclusive. The resonant frequency of the trap circuit is automatically shifted to a much lower frequency than the FM band during reception of television signals in channels 2 to 6, inclusive.

Figures 1, 2:
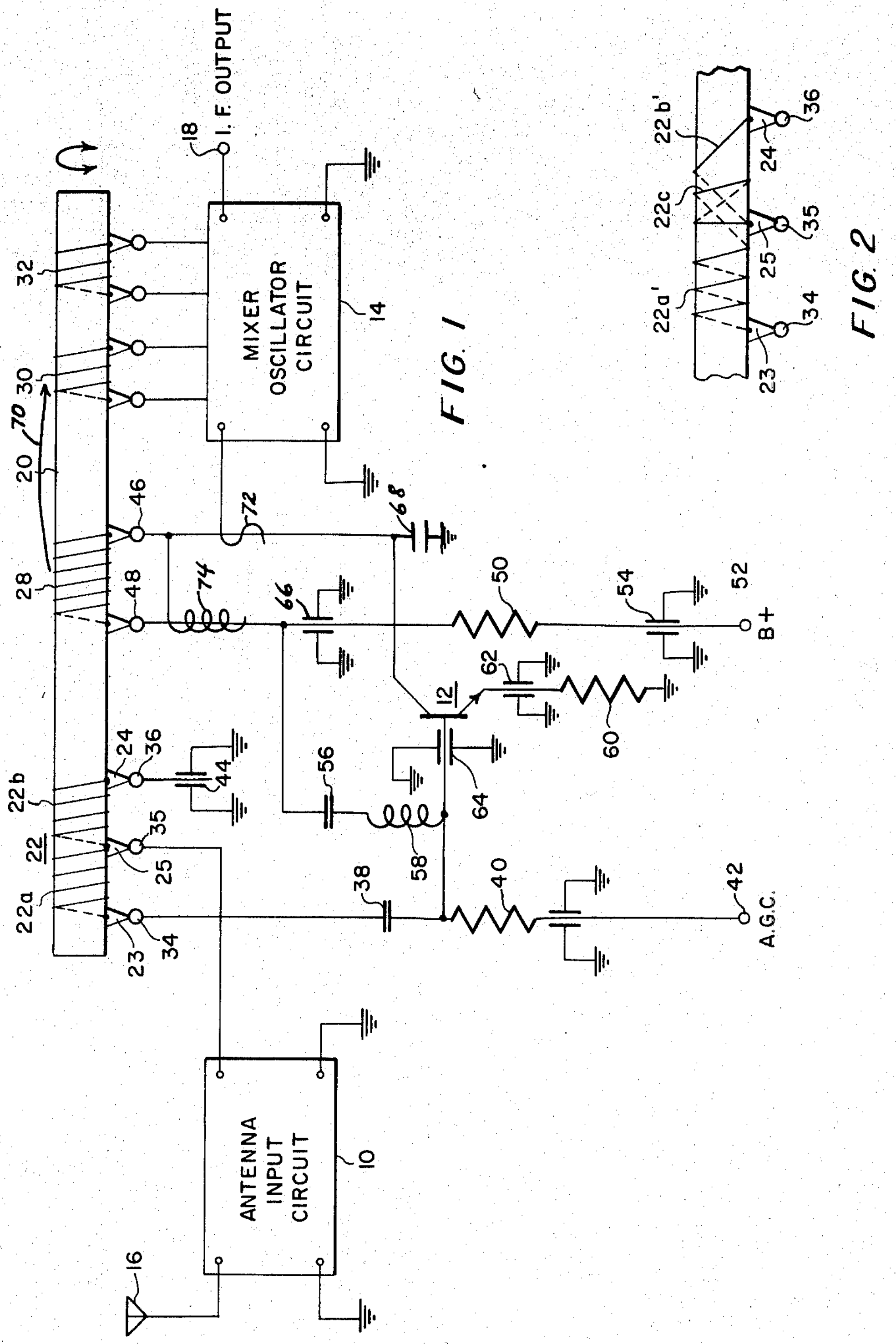

The present invention relates to tuners, more particularly to television tuners of the turret type which employ individual sticks or panels for each television channel, and the invention is particularly directed to a trap circuit which is effective to provide attenuation of undesired FM signals during reception of television signals.

According to present frequency standards, FM stations are broadcast within the frequency band of 88 megacycles to 108 megacycles, whereas the higher frequency band of VHF television stations, i.e., channels 7 to 13, inclusive, operate in the frequency band of from 174 to 216 megacycles. Signals broadcast by FM stations may thus cause interference during the reception of television signals in channels 7 to 13, inclusive. During such reception, the second harmonic component of the FM signals may fall directly in the frequency band of one of these channels and cause undesired disturbances. This second harmonic component may be generated within the tuner if an unattenuated FM signal is passed through a non-linear circuit element in the tuner, so that the FM signal is distorted sufficiently to produce second and higher order harmonic components.

Various arrangements have been proposed in the past to provide rejection for FM signals so that the above-described interference effects due to FM signals are eliminated. Most of these arrangements have provided a series resonant trap circuit comprising a capacitor and a variable inductance coil which form a relatively narrow band series resonant circuit. This series trap circuit is then adjusted in the field by a serviceman so that the series resonant circuit is tuned to reject the particular FM signal which is causing the most disturbance in that particular locality. These arrangements have several disadvantags. First, the series resonant circuit must be field serviced to adapt the tuner to a particular locality. Secondly, since the series resonant circuit remains connected in the circuit for all VHF channels, this series resonant circuit may cause severe distortion of the band pass characteristic of the tuner during reception of television signals in channel 6, which extends from 82 megacycles to 88 megacyles, particularly in those localities where the trap circuit must be set to attenuate an 88 megacycle FM signal. This is because the series resonant trap circuit, to be effective in attenuating the 88 megacycle FM signal, necessarily also affects the upper end of the tuner band pass characteristic of channel 6. A third disadvantage of these prior art arrangements is that they require at least two additional components, one of which is variable, and hence add additional cost to the tuner while at the same time requiring special alignment facilities either in the manufacturing plant or the field.

It will thus be seen that these prior art arrangements, in attempting to eliminate disturbances from second harmonic components of the FM signals in the high frequency VHF channels, introduce adjacent channel interference effects in the low frequency VHF channels, particularly channel 6. While it is possible to provide a wide band FM trap circuit which would attenuate all FM signals in the FM band from 88 to 108 megacycles, such a wide band trap circuit would require an even larger number of additional components, as in the case of the conventional 40 megacycle IF trap circuit which is included in the antenna input circuit of most tuners. Also, such a wide band FM trap circuit would introduced adjacent channel interference effects in channel 6, since it would remain in the circuit during channel 6 reception.

In addition to providing attenuation of the undesired FM signals, it is also necessary to provide an input circuit arrangement for the television tuner which will adequately match the antenna input circuit to the RF tuned circuit of the tuner and will also match this tuned circuit to the input impedance of the RF amplifier employed in the tuner.

It is an object of the present invention, therefore, to provide a new and improved trap circuit arrangement which obviates one or more of the above-discussed disadvantages of the prior art arrangements.

It is a further object of the present invention to provide a new and improved FM trap circuit for a television tuner which provides substantial attenuation of FM signals during reception of television signals in channels 7 to 13, inclusive, without the trap circuit itself introducing undesired effects during reception of channel 6 signals.

It is another object of the present invention to provide a new and improved FM trap circuit for a television tuner wherein a series resonant circuit is provided to attenuate FM signals during reception of television signals in channels 7 to 13, inclusive, and said trap circuit is automatically shifted to a frequency much lower than the FM band during reception of television signals in channels 2 to 6, inclusive.

It is still another object of the present invention to provide a new and improved FM trap circuit in which the tuning of a series resonant circuit is automatically shifted as channels 7 to 13, inclusive, are selected to provide a high degree of attenuation for the particular FM signals which will cause undesired second harmonic effects during reception in each of these channels.

It is a further object of the present invention to provide a new and improved FM trap circuit for television tuners which is effective to provide a high degree of attenuation for all FM signals during reception of television signals in channels 7 to 13, inclusive, without substantially increasing the cost of the tuner.

It is a still further object of the present invention to provide a new and improved FM trap circuit for television tuners of the turret type wherein the inductance portion of the trap circuit is successively formed by coil portions on the individual sticks of the turret tuner as different VHF stations are selected.

It is another object of the present invention to provide a new and improved FM trap circuit for television tuners which provides substantial attenuation for FM signals while requiring a minimum number of additional components and at the same time provides adequate matching of the first tuned circuit both to the antenna input circuit and to the input of a transistor type RF amplifier.

The invention, both as to its organization and method of operation, together with further objects and advantages thereof, will best be understood by reference to the following specification taken in connection with the accompanying drawings in which:

FIG. 1 is a schematic diagram of a television tuner embodying the principles of the present invention; and FIG. 2 is a schematic view illustrating an input coil arrangement useful in certain television channels.

Referring now to the drawings, the present invention is therein illustrated in conjunction with a television tuner which includes an antenna input circuit 10, an RF amplifier stage including a transistor 12 and a mixer oscillator circuit indicated generally at 14. Signals from various television stations, and to a certain extent signals from undesired FM stations, are received on a suitable antenna array 16 and are transmitted through the antenna input circuit 10 to the amplifier 12. The amplifier 12 provides suitable amplification for the received signals and the amplified signals are passed to the mixer-oscillator circuit 14 wherein they are heterodyned to a suitable IF frequency and appear on the IF output terminal 18 of the tuner. The present invention is employed in conjunction with a turret type television tuner which includes a plurality of insulating panels or sticks, one for each television channel, one of which is indicated at 20 in FIG. 1. The panel, or stick 20, has a number of inductance coils wound around the periphery thereof and connected to suitable contacts on the stick 20. Thus, an input coil comprising the inductance sections 22*a* and 22*b* is wound around the stick 20, one end of this input coil being connected to the stick contact 23 and the other end thereof being connected to the stick contact 24. A stick contact 25 is connected to the junction of the coil portions 22*a* and 22*b* and forms a tap on the input coil 22. An RF output coil 28 is also provided on the stick 20, as is a mixer coil 30 and an oscillator coil 32, these latter coils being connected to corresponding stick contacts on the stick 20. Within the television tuner, a fixed stator member is employed which is provided with a plurality of stator contacts which are arranged to establish electrical connection to the stick contacts of a particular one of the sticks 20 corresponding to the television channel which is to be received. More particularly, the stator member includes the stator contacts 34, 35 and 36 which establish contact to the stick contacts 23, 25 and 24, respectively. Similarly, stator contacts are provided for the stick contacts connected to the coils 28, 30 and 32.

The output of the antenna input circuit 10 is connected to the stator contact 35 and the stator contact 34 is connected through a capacitor 38 to the base of the transistor 12, this base also being connected through a resistor 40 to an AGC terminal 42 to which is supplied a suitable AGC potential from the television receiver proper. The stator contact 36 is connected to ground through a capacitor 44. The capacitor 44 forms a series resonant FM trap circuit with the coil portion 22*b*, as will be described in more detail hereinafter.

The collector of the transistor 12 is connected to the stator terminal 46, and through the coil 28 on the stick 20, the stator contact 48 and a resistor 50 to the B plus supply terminal 52. In order to provide neutralization for the transistor 12, so that it will operate properly as an RF amplifier with the desired band pass characteristic, a capacitor 56 and coil 58 are connected in series from the stator contact 48 to the base of the transistor 12. The emitter of the transistor 12 is connected to ground through a resistor 60 and a feedthrough capacitor 62 is employed as an AC ground for this emitter. A feedthrough capacitor 64 is also connected between the base of the transistor 12 and ground. In order to provide a suitable band pass characteristic for the collector circuit of the transistor 12 a feedthrough capacitor 66 and a capacitor 68 are connected from the stator contacts 48, 46, respectively, to ground to provide a conventional pi type band pass network.

The amplified RF signal developed in the collector circuit of the transistor 12 is coupled by mutual coupling between the coils 28 and 30, as indicated by the arrow 70 in FIG. 1, this coupling preferably being provided by positioning the coils 28 and 30 closely together on the stick 20. In addition, so-called "gimmick" coupling is provided between the collector circuit of the transistor 12 and the input of the mixer circuit 14, as indicated by the wire 72. Gimmick coupling is also provided between the stator contacts 46, 48 as indicated by the wire 74 to permit adjustment of the band pass characteristic for variations in circuit constants, as will be readily understood by those skilled in the art.

Considering now the operation of the present invention in the arrangement previously described, the tuned input circuit for the RF amplifier 12 is formed by the two portions 22*a* and 22*b* of the coil 22 in series with the capacitor 44 to ground, as one branch of the parallel resonant circuit, and the capacitor 38 in series with the base to ground capacity of the transistor 12 in parallel with the capacitor 64 as the other branch. This tuned circuit is of relatively high impedance as compared to both the impedance of the antenna input circuit 10 and the input impedance of the transistor 12. Accordingly, the tap 25 on the coil 22, i.e., the ratio of the coil portions 22*a* and 22*b* is chosen so that the impedance of the input circuit 10 will be matched to the tuned circuit impedance. Also, the ratio of the capacitor 38 to the total base to ground capacitance of the transistor 12 (including the capacitor 64) is chosen so as properly to match the above-described tuned input circuit to the input of the transistor 12. There is thus an impedance step-up between the antenna input circuit 10 and the input tuned circuit and a step-down in impedance between this input tuned circuit and the input of the transistor 12. Choice of the turns ratio between the coil portions 22*a* and 22*b* for matching to the antenna input circuit 10 determines the inductance of the coil portion 22*b*. In this connection, it will be understood that the coil portion 22*b* is shown schematically in FIG. 1 as having several turns, whereas the number of turns in this coil portion may vary considerably for sticks tuned to different channels.

The value of the capacitor 44 is then chosen in relation to the inductance of the coil portion 22*b* to constitute a series resonant circuit to ground with respect to the stator terminal 35 and hence with respect to the output of the antenna input circuit 10. The frequency of this series resonant circuit is chosen to be equal to the FM signal whose second harmonic would fall within the particular television channel to which the stick 20 is tuned. However, when a different television channel is selected, a different stick 20 is connected in circuit, as shown in FIG. 1, and the coil portion 22*b* of this stick will then be connected in series with the capacitor 44 across the antenna input circuit 10. When the stick corresponding to channel 6 is moved into operative position in the tuner the inductance of the coil portion 22*b* changes markedly due to the much lower operating frequency of channel 6 as compared to channel 7. Thus, if the coil portion has one turn for channels 7 to 13, inclusive, this portion may have two or three turns on the channel 6 stick. This means that the frequency of the series resonant trap circuit is automatically shifted to a frequency well below the FM band when the stick for channel 6, or any lower frequency VHF station, is selected. Accordingly, the FM trap circuit comprising the elements 22*b* and 44 provides attenuation for FM signals during reception in channels 7 to 13, inclusive and is tuned to a much lower frequency during reception in channels 2 to 6, inclusive, so that it does not interfere with reception in these lower frequency channels in any way.

In accordance with a further important aspect of the invention, during reception in channels 7 to 13, inclusive, the inductance of the new coil portion 22*b* is sufficiently different from that of the previous stick to shift the resonant frequency of the series resonant circuit 22*b*, 44 to provide maximum attenuation for the particular band of FM signals whose second harmonics would cause undesired interference in reception of television signals in the newly selected television channel. Thus, for example, considering first the stick 20 for the highest VHF station, i.e., channel 13, when this stick 20 is operatively connected in the tuner, channel 13 television signals at 210–216 megacycles will be received. While the tuned input circuit is thus responsive primarily to the channel 13 television signals, there is, nevertheless, a certain acceptance of signals from FM stations which transmit within the assigned frequencies of 88 megacycles to 108 megacycles. When these FM signals reach the transistor 12, second and higher order harmonics of these FM signals are generated due to various non-linearities in the circuit, limiting within the transistor, etc. Stations transmitting within the range of 105 to 108 megacycles will, therefore, produce second harmonic components falling directly within the channel 13 transmission band and hence will cause undesired disturbances in the reception of the channel 13 signals. The series resonant circuit formed by the coil portion **22*b* and the capacitor 44 is tuned to resonate within the frequency band 105–108 megacycles and has sufficient band width to attenuate substantially any FM signals in the range 105–108 megacycles. These signals are thus prevented from reaching the base of the transistor 12 so that no second harmonic components are generated and hence disturbances due to these FM signals is effectively removed. It will be noted, however, that the circuit 22*b*, 44 need not attenuate FM signals below 105 megacycles because the second harmonic of these signals will be below channel 13. Accordingly, the attenuation provided by the circuit 22*b*, 44** may be maximized in the band 105–108 megacycles.

Considering now the stick for channel 12, the coil portions **22*a* and 22*b* are wound with the same turns ratio but are wound of slightly smaller diameter wire so that the inductance of the coil portion 22*b* is slightly larger. This inductance, when combined with the capacitor 44, provides a series resonant trap circuit which will attenuate the band of FM signals whose second harmonic components will fall within the frequency band of channel 12. However, by keeping the same turns ratio between the portions 22*a* and 22*b*, the same impedance matching ratio is provided to match the antenna input circuit 10** to the tuned input circuit. In a similar manner, progressively smaller wire sizes may be employed for the sticks corresponding to channels 11, 10, etc.

The change in inductance of the coil portion **22*b* may also be achieved by employing sticks of different diameter, or having different cross sectional areas in the region of portion 22*b*. Using a larger diameter stick would have the effect of increasing the inductance of the portion 22*b* while permitting the use of the same size wire for the sticks for channels 7 to 13. In this connection it will be understood that the shift in frequency of the series resonant trap circuit 22*b*, 44 need not take place in each channel if the band pass characteristic of this circuit is sufficiently broad. However, since the total inductance of the coil 22 must be greater for each lower channel stick and the same impedance matching ratio is preferably maintained, this lends itself to an increase in inductance of the coil portion 22*b*** in successive increments as successively lower frequency channels are selected.

The desired impedance matching ratio may also be preserved while employing a different number of turns for each of the coil sections **22*a* and 22*b*. However, such an arrangement provides only a rather coarse inductance adjustment due to the fact that the number of turns in the coil sections 22*a* and 22*b* is usually quite small, and it is difficult to provide fractional turns. For example, in one embodiment the coil portion 22*a* for channel 13 comprised three turns and the coil portion 22*b* comprised only a single turn of wire around the stick 20 between the contacts 25 and 24. If the number of turns were increased to six turns for the coil portion 22*a* and two turns for the coil portion 22*b*, a radical change in inductance of the portion 22*b*** would be provided which would shift the band of rejected frequencies by too large an amount, and would also shift the tuned input circuit by too great an amount. A change in the wire size, as discussed above, has the advantages of using the same diameter sticks for all channels and yet providing the slight shift in inductance necessary to change the band of rejected FM signals to correspond to the new television channel.

In FIG. 2 an arrangement is shown which may be employed for a stick 20′ used for channels 7 and 8. In this stick arrangement, the effective inductance between the contacts 24 and 25 is increased by increasing the mutual coupling between the coil portions **22*a*′ and 22*b*′. This is done by winding the coil portion 22*a*′ so that it overlaps the area of the contact 25 as indicated by the turn 22*c* which is more closely adjacent to the single turn coil portion 22*b*′ and hence increases the inductance of this portion. At the same time, the coil portion 22*b*′ may also be made of smaller size wire to provide increased inductance. These changes in the inductance in series with the capacitor 44 will be sufficient to provide maximum attenuation for FM signals whose second harmonic components fall within the channel 7** band of 174–180 megacycles.

With the arrangement of the present invention, it has been found that the series resonant circuit provided by the coil portion **22*b* and the capacitor 44 gives an additional 20 db attenuation for FM signals which would interfere with reception in channels 7 to 13, inclusive. However, this resonant circuit is tuned to a much lower frequency during reception in channels 2 to 6 so that it does not interfere with such reception in any way. By way of example only, and not in any sense as a limitation to specific values, in a particular embodiment the capacitor 44 had a value of 120 micromicrofarads, the capacitor 38 had a value of 5.6 micromicrofarads and the capacitor 64 had a value of 6 micromicrofarads. The sticks 20 were of square cross section, 0.190 inch on a side. The channel 13 stick had a portion 22*a* of three turns of No. 26 wire and the portion 22*b* one turn of No. 26 wire. The wire size was reduced to No. 30 on the channel 7 stick with the portion 22*a* having four turns and the portion 22*b* one turn. Such an arrangement has been found satisfactory to match an antenna input circuit having 75 ohms impedance to a transistor 12 of Fairchild Type SE 5020. In this connection it will be understood that circuit constants may vary considerably depending upon the type of transistor employed, the dimensions of the stick 20**, and other factors.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a television tuner, an antenna input circuit, a rotatable support member, a plurality of individual insulating members each carrying an inductance coil and mounted on said support member, a first group of said insulating members having inductance coils for selectively receiving signals in the high frequency band of VHF stations and a second group of said insulating members having inductance coils for slectively receiving signals in the low frequency band of VHF stations, a stator member of insulating material and having a plurality of stator terminals arranged to establish electrical connections to the inductance coils on different ones of said insulating members as said support member is rotated, means connecting said antenna input circuit to one of said stator terminals, a capacitor connected from another one of said stator terminals to ground, the inductance coils of said first group of insulating members each being series resonant with said capacitor at a frequency corresponding to a band of undesired signals of substantially lower frequency than said high frequency band of VHF stations during reception of stations in said high frequency band of VHF stations, and the inductance coils of said second group of insulating members being series resonant with said capacitor at a frequency substantially lower than said band of undesired signals during reception of stations in said low frequency band of VHF stations.

2. In a television tuner, an antenna input circuit, a rotatable support member, a plurality of individual insulating members each carrying an inductance coil and mounted on said support member, a first group of said insulating members having inductance coils for selectively receiving signals in the high frequency band of VHF stations and a second group of said insulating members having inductance coils for selectively receiving signals in the low frequency band of VHF stations, a stator member of insulating material and having a plurality of stator terminals arranged to establish electrical connections to the inductance coils on different ones of said insulating members as said support member is rotated, means connecting said antenna input circuit to one of said stator terminals, a capacitor connected from another one of said stator terminals to ground, the inductance coils of said first group of insulating members each being series resonant with said capacitor at a frequency corresponding to the FM signal band during reception of stations in said high frequency band of VHF stations, and the inductance coils of said second group of insulating members being series resonant with said capacitor at a frequency substantially lower than the FM signal band during reception of stations in said low frequency band of VHF stations.

3. In a television tuner, an antenna input circuit, a rotatable support member, a plurality of insulating members each carrying an inductance coil and mounted on said support member, a stator member of insulating material and having a plurality of stator terminals arranged to establish electrical connections to the inductance coils on different ones of said insulating members as said support member is rotated, means connecting said antenna input circuit to one of said stator terminals, a capacitor connected between another of said stator terminals and ground, tuned circuit means including different ones of said inductance coils for selectively receiving signals from different VHF television stations in the high frequency band of VHF channels, the inductance coils on said insulating members each being series resonant with said capacitor at a frequency corresponding to the FM signal band when said stator terminals establish electrical connection to each such inductance coil, at least two of said inductance coils being wound with different sizes of wire so that said two coils are series resonant with said capacitor at different frequencies within the FM band.

4. In a television tuner, a controlled conduction device having an input electrode, an antenna input circuit, a rotatable support member, a plurality of individual insulating members each carrying an input coil and mounted on said support member, a stator member of insulating material and having a plurality of stator terminals arranged to establish electrical connections to the input coils on different ones of said insulating members as said support member is rotated, tuned circuit means including different ones of said input coils for selectively receiving signals from different VHF television stations in the high frequency band of VHF television channels, means connecting said antenna input circuit to a tap on the input coil of that one of said insulating members which is in engagement with said stator terminals, a capacitor connected from one of said stator terminals to ground, means connecting another of said stator terminals to said input electrode of said controlled conduction device, the portion of each of said input coils between said tap and said one stator contact being series resonant with said capacitor at a frequency corresponding to an undesired FM signal which is transmitted through said antenna input circuit during reception in the high frequency band of VHF television channels, at least two of said input coils having different inductance values so as to be series resonant with said capacitor at different portions of the FM signal band, thereby to provide maximum attenuation for those FM signals whose second harmonic components fall within said high frequency band of VHF television channels.

5. The arrangement as set forth in claim 4, wherein said difference in inductance value is achieved by employing different sized wires for the input coils on different ones of said insulating members.

6. In a television tuner, a controlled conduction device having an input electrode, an antenna input circuit, a rotatable support member, a plurality of individual insulating members each carrying an input coil and mounted on said support member, a stator member of insulating material and having first, second and third stator contacts thereon, said first and second contacts being positioned to establish connection to the ends of different ones of said input coils as said support member is rotated and said third contact being arranged to establish connection to a tap on each of said input coils, tuned circuit means including different ones of said input coils for selectively receiving signals from different VHF television stations in the high frequency band of VHF television channels, means connecting said antenna input circuit to said third stator contact, means connecting said first stator contact to said input electrode of said controlled conduction device, and a capacitor connected between said second stator contact and a point of fixed potential, the inductance portion of each of said input coils which is connected to said second and third stator contacts when connection is established to said stator member being series resonant with said capacitor at a frequency within the FM signal band, thereby to provide attenuation for those FM signals whose second harmonic components fall within said high frequency band of VHF television channels.

7. The arrangement as set forth in claim 6, wherein said tap is positioned on said input coil so that said antenna input circuit is matched to the input tuned circuit of which said input coil is a part.

8. The arrangement as set forth in claim 6, wherein a second capacitor is connected from said first stator contact to said input electrode so that an input tuned circuit is provided which includes said input coil, said second capacitor and the input capacity of said controlled conduction device, said tap being positioned on said input coil so that said antenna input circuit is matched to said input tuned circuit.

References Cited

UNITED STATES PATENTS

| | | | |
|---|---|---|---|
| 2,216,540 | 10/1940 | Mountjoy | 325—379X |
| 2,708,238 | 5/1955 | Silverman | 325—379X |
| 2,785,297 | 3/1957 | Scandurra | 325—459X |
| 3,083,339 | 3/1963 | Bell | 325—461X |
| 3,099,808 | 7/1963 | Hobley | 325—477X |

ROBERT L. GRIFFIN, Primary Examiner

R. S. BELL, Assistant Examiner

U.S. Cl. X.R.

325—477; 334—49